(12) United States Patent
Matsuki

(10) Patent No.: US 8,010,746 B2
(45) Date of Patent: Aug. 30, 2011

(54) DATA PROCESSING APPARATUS AND SHARED MEMORY ACCESSING METHOD

(75) Inventor: Toshihisa Matsuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 12/232,208

(22) Filed: Sep. 12, 2008

(65) Prior Publication Data

US 2009/0100225 A1    Apr. 16, 2009

(30) Foreign Application Priority Data

Oct. 16, 2007    (JP) .................... 2007-268491

(51) Int. Cl.
*G06F 12/00* (2006.01)
(52) U.S. Cl. ......... 711/118; 709/247; 711/147; 711/153
(58) Field of Classification Search ............... 711/118, 711/147, 153; 709/247
See application file for complete search history.

(56) References Cited

U.S. PATENT DOCUMENTS

2001/0001872 A1 * 5/2001 Singh et al. ................. 711/129

FOREIGN PATENT DOCUMENTS

JP    05-073413    3/1993

* cited by examiner

*Primary Examiner* — Jae U Yu
(74) *Attorney, Agent, or Firm* — Rader, Fishman & Grauer PLLC

(57) ABSTRACT

The present invention provides a data processing apparatus for processing data by causing a plurality of function blocks to share a single shared memory, the data processing apparatus including: a memory controller configured to cause the plurality of function blocks to write and read data to/and from the shared memory in response to requests from any one of the function blocks; a cache memory; and a companding section configured to compress the data to be written to the cache memory while expanding the data read therefrom.

6 Claims, 5 Drawing Sheets

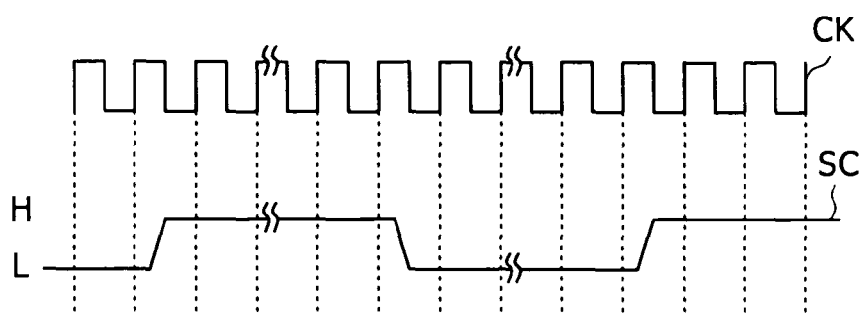
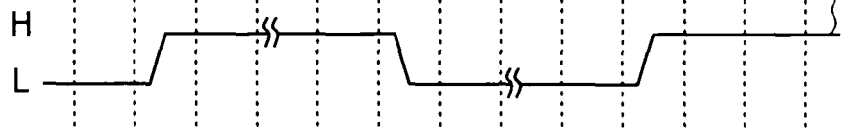
FIG. 4A
FIG. 4B
FIG. 5
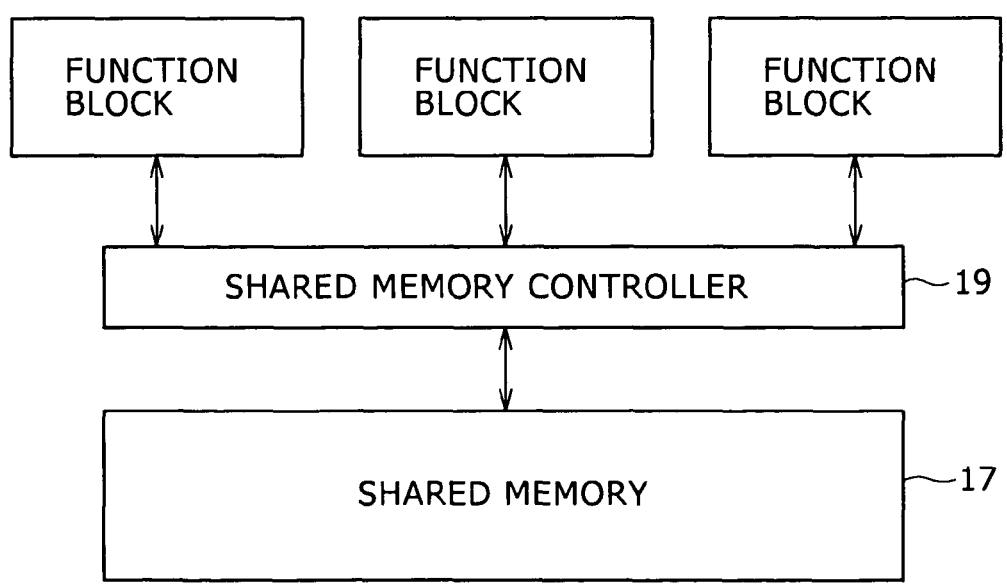

DATA PROCESSING APPARATUS AND SHARED MEMORY ACCESSING METHOD

CROSS REFERENCES TO RELATED APPLICATIONS

The present invention contains subject matter related to Japanese Patent Application JP 2007-268491 filed with the Japan Patent Office on Oct. 16, 2007, the entire contents of which being incorporated herein by reference.

BACKGROUND OF THE INVENTION

1. Field of the Invention

The present invention relates to a data processing apparatus and a shared memory accessing method. More particularly, the invention relates to a video camera acting as a data processing apparatus for processing image data. In having a shared memory structured to include a cache area, a compressed cache area, and a non-cache area which are switched from one to another in a caching process for allowing the single shared memory to be shared by a plurality of function blocks, the invention envisages shortening the time required by each of the function blocks to access the shared memory while reducing the size of a cache memory.

2. Description of the Related Art

Recent years have witnessed the widespread use of a certain type of video equipment such as video cameras that allow a plurality of function blocks to share a single shared memory for processing image data. FIG. 7 is a block diagram showing a typical video camera 1 in which one shared memory 5 is shared by a plurality of function blocks. In the video camera 1, a first, a second and a third function block 2, 3 and 4 share the single memory 5.

The first function block 2 is a data processing circuit that performs such image-related processes as white balance control and gamma correction. The second function block 3 is a data processing circuit that illustratively resizes image data into a size suitable for display on a display section, not shown. The third function block 4 is a data processing circuit that compresses and expands image data illustratively through the use of MPEG (Moving Picture Experts Group) techniques. The video camera 1 acquires image data using an imaging section, not shown, and stores the acquired image data into the shared memory 5 consecutively. The image data placed in the shared memory 5 is processed successively by the first and the second function blocks 2 and 3 for display. In accordance with the user's instructions, the image data processed by the first function block 2 may be processed by the third function block 4 before being recorded to a recording medium, not shown. The video camera 1 may also read image data from the recording medium, place the retrieved image data into the shared memory 5, and have the third and the second function blocks 4 and 3 process the data in the shared memory 5 successively for display.

The first through the third function blocks 2 through 4 are connected to a shared memory controller 6 via a bus. The first through the third function blocks 2 through 4 may each request the shared memory controller 6 to read image data or other resources. In response to the read request, the shared memory controller 6 outputs the requested image data which is then processed by the requesting function block. Each of the first through the third function blocks 2 through 4 may also request the shared memory controller 6 to write image data or the like. In keeping with the response from the shared memory controller 6, the requesting function block outputs the image data of interest to the shared memory controller 6.

In response to a read request from any one of the first through the third function blocks 2 through 4, the shared memory controller 6 reads the requested data from the shared memory 5 and places the read data onto the bus. Responding to a write request from any one of the first through the third function blocks 2 through 4, the shared memory controller 6 writes to the shared memory 5 the data that is input from the request function block. According to the structure outlined in FIG. 7, the memory size is made smaller than if each of the function blocks is furnished with its own memory.

Usually, computers utilize the cache memory scheme for boosting the speed of access to recording media. Japanese Patent Laid-open No. Hei 5-73413 discloses a method whereby the data to be written to a cache memory is compressed in order to reduce the cache memory size.

Illustratively, large quantities of data may come to be processed in the structure of FIG. 7. In such a case, the masses of data exchanged between the shared memory 5 and the shared memory controller 6 may exhaust the bandwidth therebetween. In the structure of FIG. 7, that means it takes so much time to transfer data between one function block and the shared memory controller 6 over the bus that the other function blocks cannot gain access to the shared memory for an extended period of time. As a result, the time required by each of the function blocks to access the shared memory tends to be inordinately prolonged.

One way to solve the problem outlined above is by utilizing a cache memory. However, the simple use of the cache memory scheme entails the disadvantage of a growing cache memory size. The bloated cache memory may be reduced using techniques such as one disclosed in Japanese Patent Laid-open No. Hei 5-73413. This kind of technique tends to require spending a lot of time compressing and expanding the data to be input and output to and from the cache memory. Another way to solve the problem of the massive data transfer between the function blocks and the shared memory controller 6 is by expanding the bandwidth through acceleration of the shared memory 5 and the shared memory controller 6 in operation. This solution, however, involves increasing dissipation of power.

SUMMARY OF THE INVENTION

The present invention has been made in view of the above circumstances and provides a plurality of function blocks sharing a single shared memory in such a structure that the size of a cache memory is reduced while the time required by each of the function blocks to access the shared memory is shortened.

In carrying out the present invention and according to one embodiment thereof, there is provided a data processing apparatus for processing data by causing a plurality of function blocks to share a single shared memory. The data processing apparatus includes: a memory controller configured to cause the plurality of function blocks to write and read data to and from the shared memory in response to requests from any one of the function blocks; a cache memory; and a companding section configured to compress the data to be written to the cache memory while expanding the data read therefrom. Wherein the memory controller checks to determine which of a plurality of areas in the shared memory a write and or read request from any one of the function blocks corresponds to; wherein, if the write and/or read request from one of the function blocks is found corresponding to a cache area of the shared memory, then the memory controller causes the data to be written and/or read to and/or from the shared memory and the cache memory in such a manner that the data is subjected to a caching process involving the use of the cache memory. Wherein, if the write and/or read request from one of the function blocks is found corresponding to a compressed cache area of the shared memory, then the memory controller causes the data to be written and/or read to and/or from the shared memory and the shared cache memory in such a manner that the data is compressed by the companding section before being subjected to a caching process involving the use of the cache memory. Wherein, if the write and/or read request from one of the function blocks is found corresponding to a non-cache area of the shared memory, then the memory controller stops the use of the cache memory while causing the data to be written and/or read to/and from the shared memory.

According to another embodiment of the present invention, there is provided a shared memory accessing method for use with a data processing apparatus for processing data by causing a plurality of function blocks to share a single shared memory, the shared memory accessing method including the steps of: compressing the data to be written to a cache memory while expanding the data read therefrom. Determining which of a plurality of areas in the shared memory a write and/or read request from any one of the function blocks corresponds to; if in the determining step the write and/or read request from one of the function blocks is found corresponding to a cache area of the shared memory, then causing the data to be written and/or read to and/or from the shared memory and the cache memory in such a manner that the data is subjected to a caching process involving the use of the cache memory. If in the determining step the write and/or read request from one of the function blocks is found corresponding to a compressed cache area of the shared memory, then causing the data to be written and/or read to and/or from the shared memory and the shared cache memory in such a manner that the data is compressed in the companding step before being subjected to a caching process involving the use of the cache memory. And if in the determining step the write and/or read request from one of the function blocks is found corresponding to a non-cache area of the shared memory, then stopping the use of the cache memory while causing the data to be written and/or read to/and from the shared memory.

Where the present invention is embodied as described above, the cache area, compressed cache area, and non-cache area are established so as to make up a structure that allows the caching process to be changed depending on the type of data to be recorded to the shared memory for efficient cache memory utilization. The inventive structure makes it possible to reduce the cache memory size while shortening the time required by each of the function blocks to gain access to the shared memory.

According to the present invention, as outlined above, a plurality of function blocks share a single shared memory in a structure that reduces the cache memory size while shortening the time required by each function block to access the shared memory.

BRIEF DESCRIPTION OF THE DRAWINGS

FIGS. 4A and 4B are timing charts explanatory of how the video camera of FIG. 2 is switched in operation;

FIG. 5 is a block diagram showing a structure of a further embodiment of the present invention;

DETAILED DESCRIPTION OF THE PREFERRED EMBODIMENTS

The preferred embodiments of the present invention will now be described in reference to the accompanying drawings.

First Embodiment (1) Structure of the First Embodiment

Figure 1:
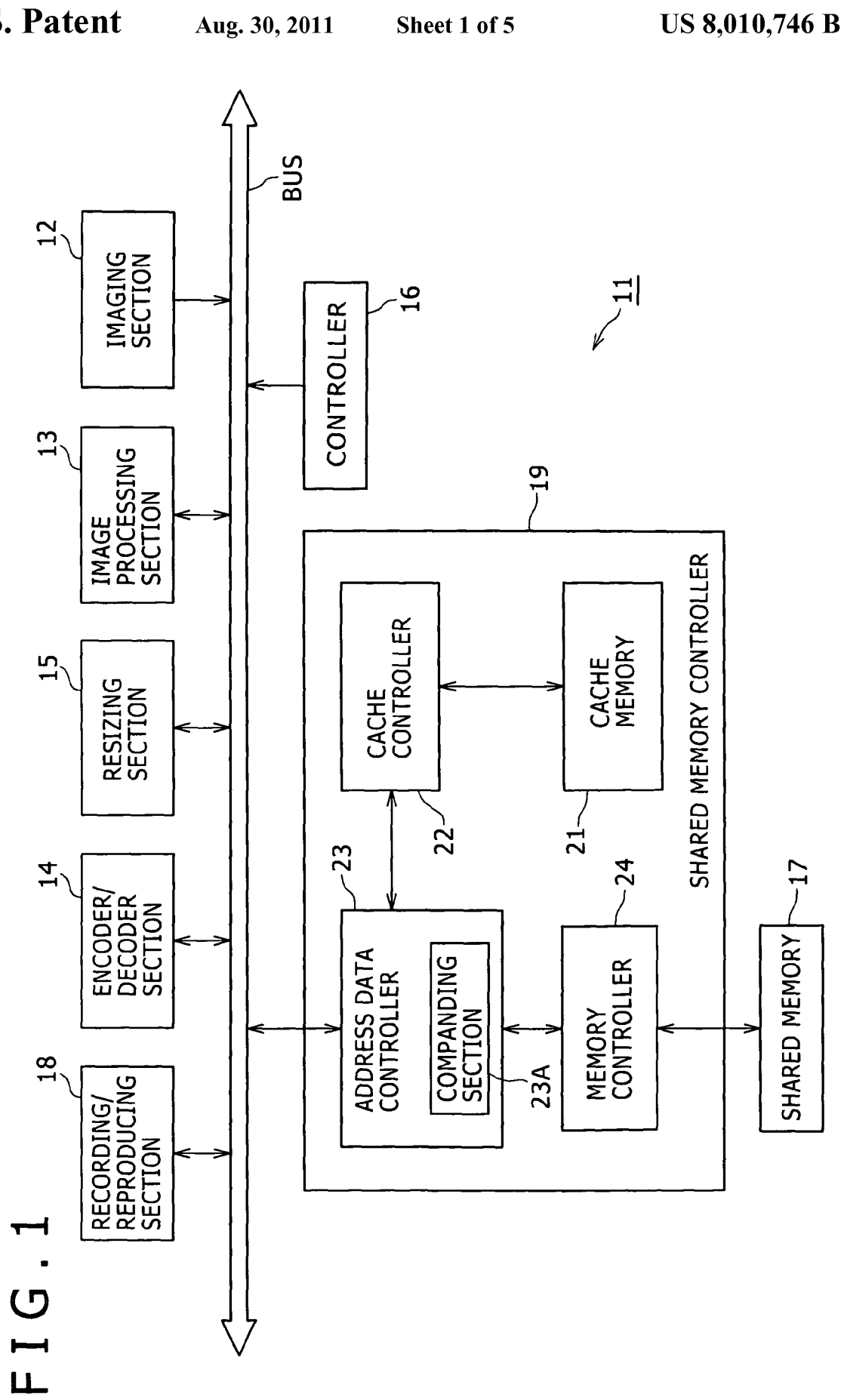
FIG. 1 is a block diagram showing a structure of a video camera practiced as one embodiment of the present invention.

FIG. 1 is a block diagram showing a structure of a video camera 11 practiced as a first embodiment of the present invention. Upon recording, an imaging section 12 of the video camera 11 acquires image data successively. The image data thus acquired is processed consecutively by an image processing section 13 (constituting the first and the second function blocks) and by a resizing section 15 before being displayed on a display section, not shown. The image data may be processed by the image processing section 13 as instructed by the user before being processed by an encoder/decoder section 14 (constituting the third function block) and recorded to a suitable recording medium such as a memory card. Upon reproduction, the image data recorded on the recording medium is processed by the encoder/decoder section 14 and resizing section 15 successively before being displayed on the display section. The recording medium may be selected from a wide range of suitable media including optical disks and magnetic disks.

Under control of a controller 16, the imaging section 12 acquires image data successively by imaging a desired object and places the acquired data into a shared memory 17. The image processing section 13 performs image related processes such as white balance control and gamma correction on the image data in the shared memory 17. At the start of recording to the recording medium, the image processing section 13 creates thumbnails for index use by thinning the image data held in the shared memory 17 and places the thumbnails thus created into the shared memory 17. The resizing section 15 resizes the image data in the shared memory 17 to a resolution suitable for display and outputs the resized data to the display section, not shown. The encoder/decoder section 14 compresses or expands the image data in the shared memory 17 using illustratively MPEG techniques and places the compressed or expanded data into the shared memory 17. A recording/reproducing section 18 records to the recording medium (e.g., memory card, not shown) the image data as well as thumbnail data held compressed in the shared memory 17. The recording/reproducing section 18 also reads image data from the recording medium and outputs the read data to the shared memory 17 and controller 16. The shared memory 17 is illustratively constituted by a random access memory.

In response to the user's operations, the controller 16 controls the sections of the video camera 11 in operation. More specifically, according to the user's instructions, the controller 16 may tell the imaging section 12 to acquire image data and may instruct the image processing section 13, encoder/decoder section 14, resizing section 15, and recording/reproducing section 18 to process the acquired image data. Also according to the user's instructions, the controller 16 may control the recording/reproducing section 18 in such a manner as to display a list of thumbnails for index use following their retrieval from the recording medium. When the user selects one of the listed thumbnails, the image data corresponding to the selected thumbnail is reproduced successively from the recording medium under control of the encoder/decoder section 14 and resizing section 15.

The imaging section 12, image processing section 13, encoder/decoder section 14, resizing section 15, controller 16, and recording/reproducing section 18 exchange image data with the shared memory 17 through the bus and a shared memory controller 19 inside the video camera 11. As needed, the image processing section 13, encoder/decoder section 14, and resizing section 15 may store into the shared memory 17 any half-processed (i.e., intermediate) data and various parameters required for image data processing. In that sense, at least the image processing section 13, encoder/decoder section 14, and resizing section 15 share the shared memory 17 and thereby make up a data processing circuit that processes the data held in the shared memory 17.

The shared memory controller 19 includes a cache memory 21. In the shared memory controller 19, a cache controller 22 under control of an address data controller 23 records to the cache memory 21 the data output by the address data controller 23 or reads data from the cache memory 21 and outputs the read data to the address data controller 23. A memory controller 24 under control of the address data controller 23 records to the shared memory 17 the data output by the address data controller 23 or reads data from the shared memory 17 and outputs the read data to the address data controller 23.

The address data controller 23 controls the memory controller 24 in operation in response to requests from the imaging section 12, image processing section 13, encoder/decoder section 14, resizing section 15, controller 16, and recording/reproducing section 18. The memory controller 24 under control of the address data controller 23 records to the shared memory 17 the data output by the imaging section 12, image processing section 13 and other sections, or outputs data retrieved from the shared memory 17 to the image processing section 13 and other sections. In controlling the operations regarding the shared memory 17, the address data controller 23 checks address data output by the sections 12 through 16 and 18 and carries out a caching process in accordance with the result of the check.

Figure 2:
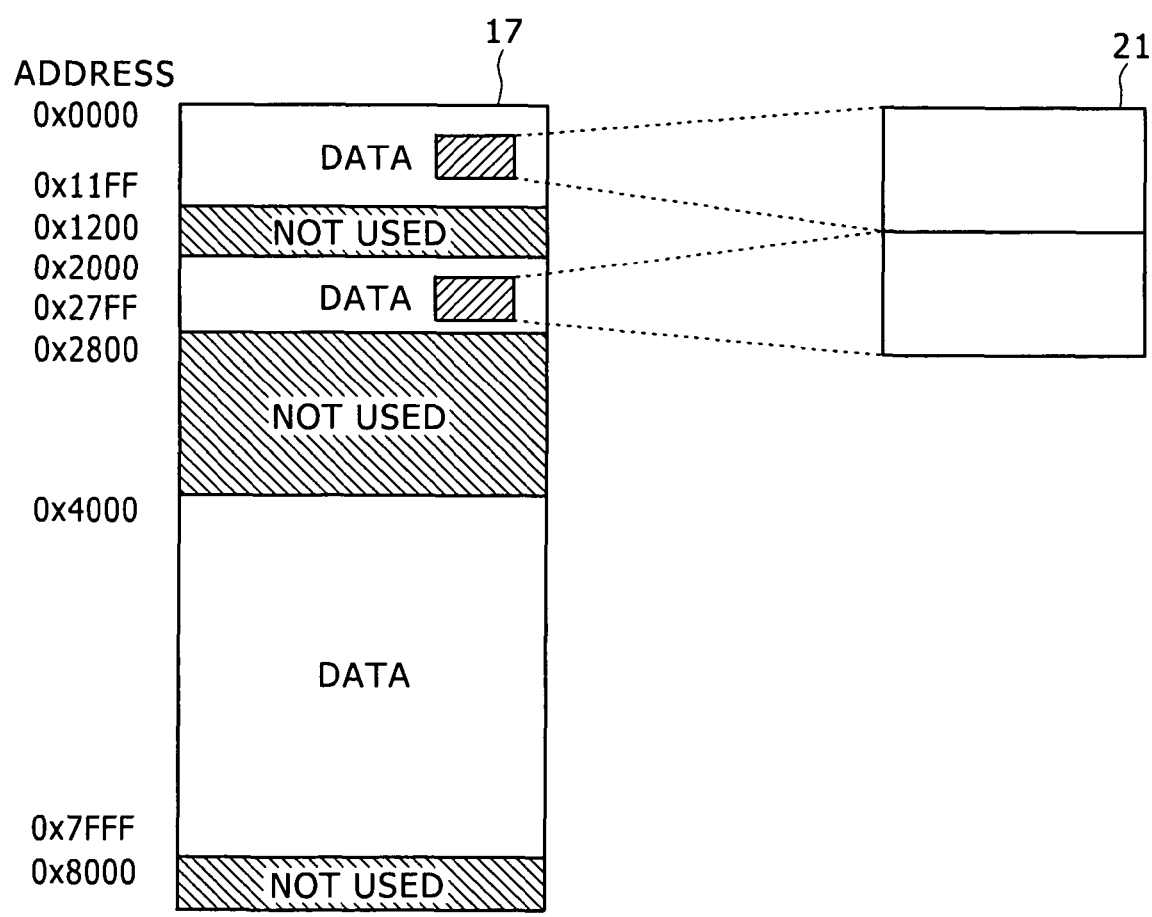
FIG. 2 is a schematic view showing a memory map of a shared memory in the video camera of FIG. 1.

FIG. 2 schematically shows a memory map of the shared memory 17. In the shared memory 17, as indicated, an address space ranging from starting address (0x0000) to address (0x11FF) is allocated as a cache area. An address space ranging from address (0x2000) to address (0x27FF) is allocated as a compressed cache area. An address space ranging from address (0x4000) to address (0x7FFF) is allocated as a non-cache area. These address spaces are allocated as the memory space in the shared memory 17; other address spaces are not used.

The cache area is an area for caching the data to be input and output to/and from the shared memory 17 without being compressed. If the address data issued by any one of the sections 12 through 16 and 18 points to an address in the cache area, then the address data controller 23 controls the cache controller 22 in operation so as to perform a caching process.

More specifically, upon input of a write request requesting a write operation on the cache area, the address data controller 23 writes to the cache memory 21 and shared memory 17 the data being input by this write request. The data may be recorded to the cache memory 21 either in write/through mode or in write/back mode. The write/through mode involves writing data simultaneously to the cache memory 21 and shared memory 17. The write/back mode involves first writing data to the cache memory 21 then reading it therefrom before writing the retrieved data to the shared memory 17. Although the write/back mode is more complicated in procedures than the write/through mode, the write/back mode is preferred because it provides a write complete notification when the data has been written to the cache memory 21. This means that the write/back mode permits a more accelerated write process than the write/through mode when viewed from the outside.

Upon input of a read request requesting a read operation on the cache area, the address controller 23 checks to determine whether the target data to be read by this request is held in the cache memory 21. If the target data is found in the cache memory 21, then the address data controller 23 stops reading data from the shared memory 17, reads the target data from the cache memory 21, and outputs the retrieved data. If the target data is not found in the cache memory 21, then the address data controller 23 reads the target data from the shared memory 17, outputs the read data, and places the same data into the cache memory 21. In FIG. 2, those areas in the shared memory 17 which accommodate the data to be read from the memory spaces of the cache memory 21 are shown hatched.

The compressed cache area is an area for caching compressed data. If the address data issued by any one of the sections 12 through 16 and 18 is found to denote an address in the compressed cache area, then the address data controller 23 compresses or expands the target address using a companding section 23A and causes the cache controller 22 to effect a caching process involving the processed data.

More specifically, upon input of a write request requesting a write operation on the compressed cache area, the address data controller 23 records to the shared memory 17 the data being input by the write request. The address data controller 23 then causes the companding section 23A to compress the data before recording the compressed data to the cache memory 21. The data may be written to the cache memory 21 either in write/through mode or in write/back mode.

Upon input of a read request requesting a read operation on the compressed cache area, the address data controller 23 checks to determine whether the target data to be read by the write request is held in the cache memory 21. If the target data is found in the cache memory 21, then the address data controller 23 stops reading data from the shared memory 17, reads the target data from the cache memory 21, expands the read data using the companding section 23, and outputs the expanded data onto the bus. If the target data is not found in the cache memory 21, then the address data controller 23 reads the target data from the shared memory 17, outputs the retrieved data, and compresses the same data using the companding section 23A before storing the compressed data into the cache memory 21.

The non-cache area is an area not used for caching data. When the address data issued by any one of the sections 12 through 16 and 18 is found to represent an address in the non-cache area, the address data controller 23 stops carrying out the caching process.

More specifically, upon input of a write request requesting a write operation on the non-cache area, the address data controller 23 writes to the shared memory 17 the data being input by this write request. Upon input of a read request requesting a read operation on the non-cache area, the address data controller 23 reads the requested data from the shared memory 17 and outputs the retrieved data.

The cache area permits higher access speeds than the compressed cache area and non-cache area but requires a large capacity of the cache memory 21. The compressed cache area is subject to lower access speeds than the cache area but permits higher access speeds than the non-cache area. Furthermore, the compressed cache area needs a smaller capacity of the cache memory 21 than the cache area. The non-cache area is subject to lower access speeds than the cache area and compressed cache area but has no need for the cache memory 21.

The above-described features of the memory areas are effectively taken advantage of by the video camera 11 for memory area allocation. Data is allocated to the cache area if the use of the cache area to hold the data is deemed most conducive to enhancing the efficiency of access to the stored data. Data is allocated to the compressed cache area if the use of the compressed cache area to hold the data is deemed conducive to boosting the efficiency of access to the stored data, even though the priority of the data is not high enough to justify the allocation of the cache area. Data is allocated to the non-cache area if the use of the cache area or compressed cache area to hold the data is not deemed justified in terms of the efficiency of access to the stored data.

In other words, data is allocated to the cache area if the frequency of access to the data in question is deemed high and if the data to be retrieved from the shared memory 17 is highly likely to be found in the cache memory 21. Data is allocated to the compressed cache area if the frequency of access to the data in question is deemed high and if the data to be retrieved from the shared memory 17 is highly likely to be found in the cache memory 21 even though the frequency of access to the data and the likelihood of the data being found in the cache memory 17 are not deemed as high as when the cache area is utilized. Data is allocated to the non-cache area if the frequency of access to the data in question is deemed low. Alternatively, the size of the data to be recorded to the cache memory may be checked, and large-size data may be allocated to the compressed cache area and small-sized data to the cache area.

Illustratively with this embodiment, the image data processed successively by the image processing section 13, resizing section 15, and encoder/decoder section 14 is allocated to the non-cache area. The parameters used by the image processing section 13, resizing section 15, and encoder/decoder section 14 in operation are allocated to the cache area along with the intermediate data half-processed by these sections. Index-use data and thumbnail data used by the image processing section 13, resizing section 15, and encoder/decoder section 14 in operation are allocated to the compressed cache area. Reference image data used by the encoder/decoder section 14 to create predictive values is allocated to the compressed cache area.

The imaging section 12, image processing section 13, resizing section 15, encoder/decoder section 14, recording/reproducing section 18, and controller 16 then issue addresses to the shared memory controller 19 in accordance with the data allocations to the cache area, compressed cache area, and non-cache area.

(2) Operation of the First Embodiment

With the video camera 11 structured as described above, the image data obtained by the imaging section 12 is subjected to image processing by the image processing section 13 before being processed by the resizing section 15 for display. The resulting image data from the image processing section 13 is compressed by the encoder/decoder section 14 before being recorded to the recording medium by the recording/reproducing section 18. The image processing section 13 also creates thumbnails for index use, and the image data constituting the thumbnails is recorded to the recording medium by the recording/reproducing section 18. The image data recorded on the recording medium is reproduced by the recording/reproducing section 18 and expanded by the encoder/decoder section 14 before being processed by the resizing section 15 for display. The thumbnails for index use recorded on the recording medium are also reproduced and displayed in like manner.

The imaging section 12, image processing section 13, encoder/decoder section 14, resizing section 15, and recording/reproducing section 18 are connected to the shared memory 17 through the bus and shared memory controller 19 in the video camera 11. The image processing section 13, encoder/decoder section 14, and resizing section 15 share the shared memory 17 when processing image data. This structure reduces the overall memory size compared with an ordinary setup in which the image processing section 13, encoder/decoder section 14, and resizing section 15 would each be furnished with a memory for handling data. The use of the shared memory 17 as a buffer memory by the imaging section 12 and recording/reproducing section 18 also contributes to reducing the overall memory size.

If the image processing section 13, encoder/decoder section 14, and resizing section 15 were to share the shared memory 17, the bandwidth of the shared memory 19 may well be exhausted and the time required to access the shared memory 17 may be prolonged correspondingly. In that case, it may become impossible to process image data in real time.

The bottleneck above is circumvented by the video camera 11 having the shared memory controller 19 furnished with the cache memory 21. The use of the cache memory 21 is designed to boost the speed of access to the shared memory 17.

However, simply installing the cache memory 21 can lead to an unruly growth of its size. This is avoided in the video camera 11 by categorizing the data to be stored into the shared memory 17 depending on the data size and on how likely the efficiency of access to the data in question is enhanced by use of the cache memory. The cache area, compressed cache area, and non-cache area in the shared memory 17 are each assigned suitably categorized data for storage. Furthermore, the cache area, compressed cache area, and non-cache area are switched from one to another for different caching processes. As a result, the video camera 11 utilizes the cache memory 21 efficiently so as to prevent the cache memory 21 from growing in size and to shorten the time required by each function block to access the shared memory 17.

More specifically, data and the data of various parameters are allocated to the cache area. It might happen that checking the address issued by the image processing section 13 or some other section against the memory map of the shared memory 17 reveals a memory access operation destined for the cache area. In that case, half-processed data and the data of various parameters are written to or read from the shared memory 17 by simply using the cache memory 21 for caching purposes. With such data allocated to the cache area, it is possible to shorten the access time using the cache memory 21.

Index use data and the image data making up thumbnails are allocated to the compressed cache area. It might happen that checking a given address against the memory map of the shared memory 17 reveals a memory access operation destined for the compressed cache area. In that case, the companding section 23A in the shared memory controller 19 compresses the data involved for caching purposes. With such data allocated to the compressed cache area, the companding section 23A serves to prevent the cache memory 21 from growing in size and shorten the access time using the cache memory 21, but in a manner not as evident as with the cache area.

There exists image data which is processed successively by the image processing section 13, encoder/decoder section 14, and resizing section 15 and which is thus not conducive to improved efficiency of access when handled using the cache memory 21. In that case, the image data is allocated to the non-cache area. If checking a given address against the memory map of the shared memory 17 reveals a memory access operation destined for the non-cache area, then the cache memory 21 is not used. The wasteful recourse to the cache memory 21 is thus avoided.

(3) Effects of the First Embodiment

With the above-described structure in place, the shared memory is provided with the cache area, compressed cache area, and non-cache area which are switched from one to another in caching different types of data. This permits efficient cache memory utilization. Where a single shared memory is shared by a plurality of function blocks, the inventive structure prevents the cache memory from growing in size and shortens the time taken by each function block to access the shared memory.

Second Embodiment

Figure 3:
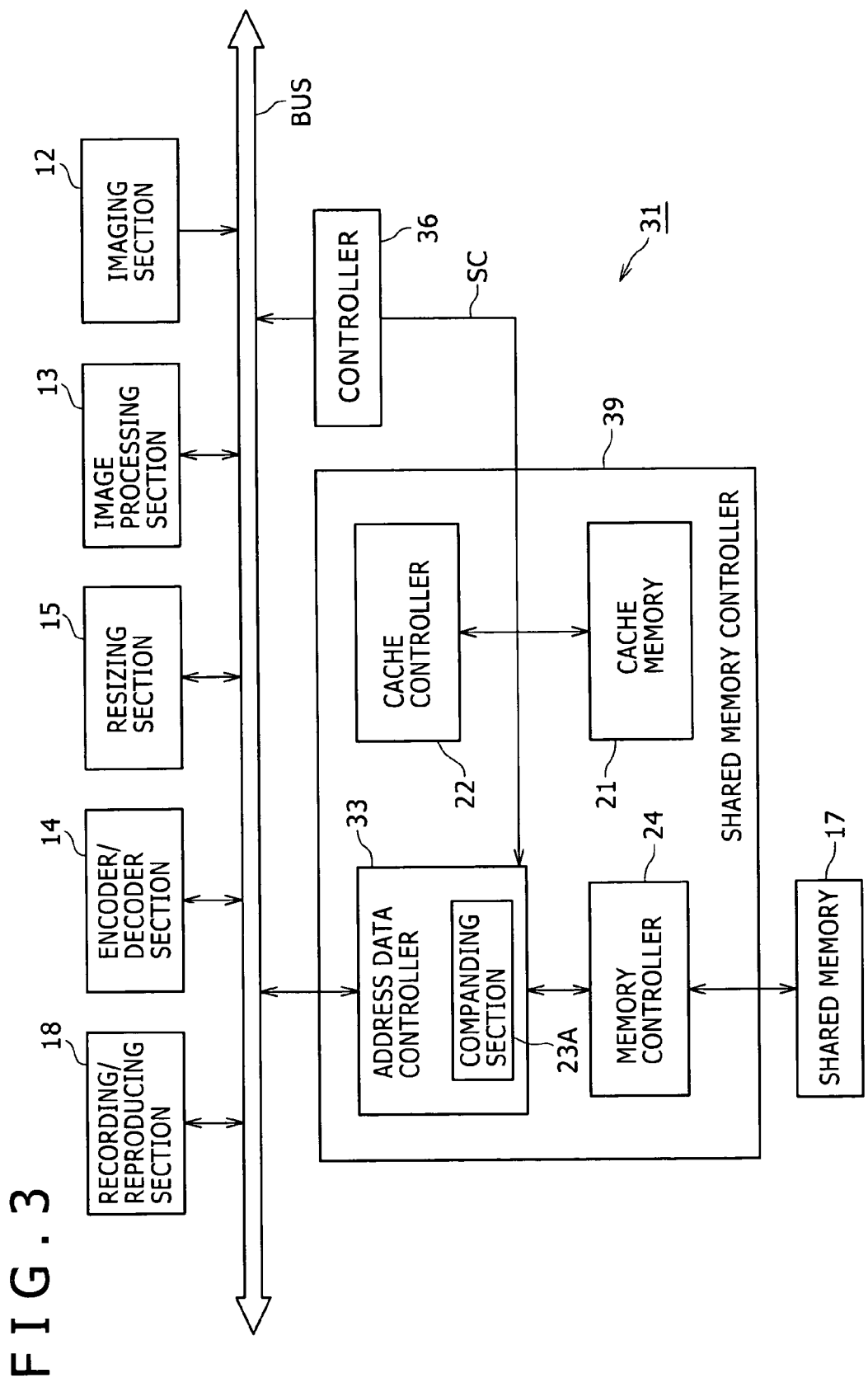
FIG. 3 is a block diagram showing a structure of a video camera practiced as another embodiment of the present invention.

FIG. 3 is a block diagram showing a structure of a video camera 31 practiced as a second embodiment of the present invention. In keeping with a control signal SC from a controller 36, the video camera 31 controls an address data controller 33 in operation. The video camera 31 is structurally the same as the video camera 11 of the first embodiment except that the controller 36 serves to switch caching processes.

If the control signal SC is set for the Low level, then a shared memory controller 39 performs caching in the same manner as the shared memory controller 19 of the first embodiment. If the control signal SC is set for the High level, then the shared memory controller 39 switches caching processes regarding access to the cache area. More specifically, with the control signal SC set for the High level, the shared memory controller 39 handles access operations on the compressed cache area and non-cache area in the same manner as when the control signal SC is set for the Low level. With the control signal SC set for the High level, the shared memory controller 39 performs access operations on the cache area using compressed data for caching, in the same manner as in the case of access to the compressed cache area.

When the control signal SC is set for the High level, caching may be stopped regarding access to the cache area. In the case of access to the compressed cache area, the compression or expanding of data may be stopped. Access operations on the compressed cache area may then be carried out in the same manner as in the case of access to the cache area with the control signal SC set for the Low level. Alternatively, caching as a whole may be stopped. In conjunction with the switching of such caching processes, the assignments of areas in the cache memory may be changed. Illustratively, that area in the cache memory 21 which is allocated to the cache area may be appropriated for processing involving the compressed cache area. Where the logic levels of the control signal SC are changed so as to alter cache memory status with the second embodiment, it may become necessary to flush the cache memory 21 in order to reset the data held therein. This may apply illustratively when the address space that was initially allocated as the cache area or compressed cache are is appropriated anew as the non-cache area.

The controller 36 sets the control signal SC for the Low level in synchronism with a clock CK if the amount of the data accessed in the shared memory 17 is increased in response to the user's operations, as illustrated in FIGS. 4A and 4B. With the second embodiment, the control signal SC is set for the High level if imaged results are simply acquired and monitored on the display section. If imaged results are to be recorded compressed while being monitored, then the control signal SC is set for the Low level.

With the second embodiment, as described above, caching processes are switched by the controller in order to vary the amount of data to be handled and to change the necessary speed of processing in a suitably constituted system. The second embodiment of the invention thus provides the same effects as those of the first embodiment.

Third Embodiment

With the first and the second embodiments of the invention described above, the address of a write or read request from a given function block is checked against the memory map of the shared memory. The check reveals to which area in the shared memory the write or read request from the function block corresponds. However, this is not limitative of the present invention. Alternatively, which of the function blocks has issued the write or read request may be first determined. Once the requesting function block is identified, it is possible accordingly to determine to which area in the shared memory the write or read request from the function block corresponds.

With the first and the second embodiments described above, caching was shown performed so as to both write and read data to/and from the shared memory. Alternatively, caching may be carried out for either writing or reading data to or from the shared memory.

In connection with the first and the second embodiments above, the data output by each function block was shown to be recorded uncompressed to the shared memory. Alternatively, the output data may be recorded in compressed form to the shared memory. The data compressing arrangement reduces the size of the shared memory. As another alternative, data may be recorded compressed to only one of the cache area, compressed cache area, and non-cache area of the shared memory.

With the first and the second embodiments above, the function blocks were shown connected to the shared memory controller by way of the bus. Alternatively, as illustrated in FIG. 5, the function blocks may be directly connected to the shared memory controller without the intervention of a bus. Because the memory controller in this setup recognizes which function block is currently accessing the memory, it is possible to set the cache area, compressed cache area, and non-cache area for each of the function blocks involved.

Figure 6:
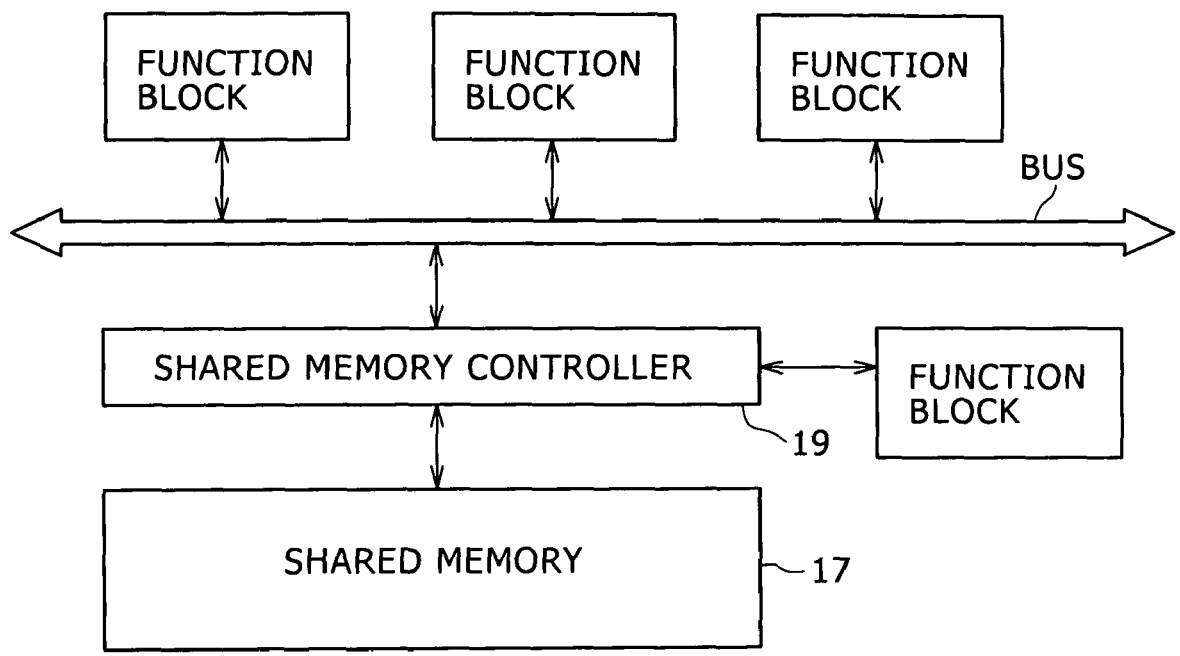
FIG. 6 is a block diagram showing a structure of an even further embodiment of the invention different from that in FIG. 5.
Figure 7:
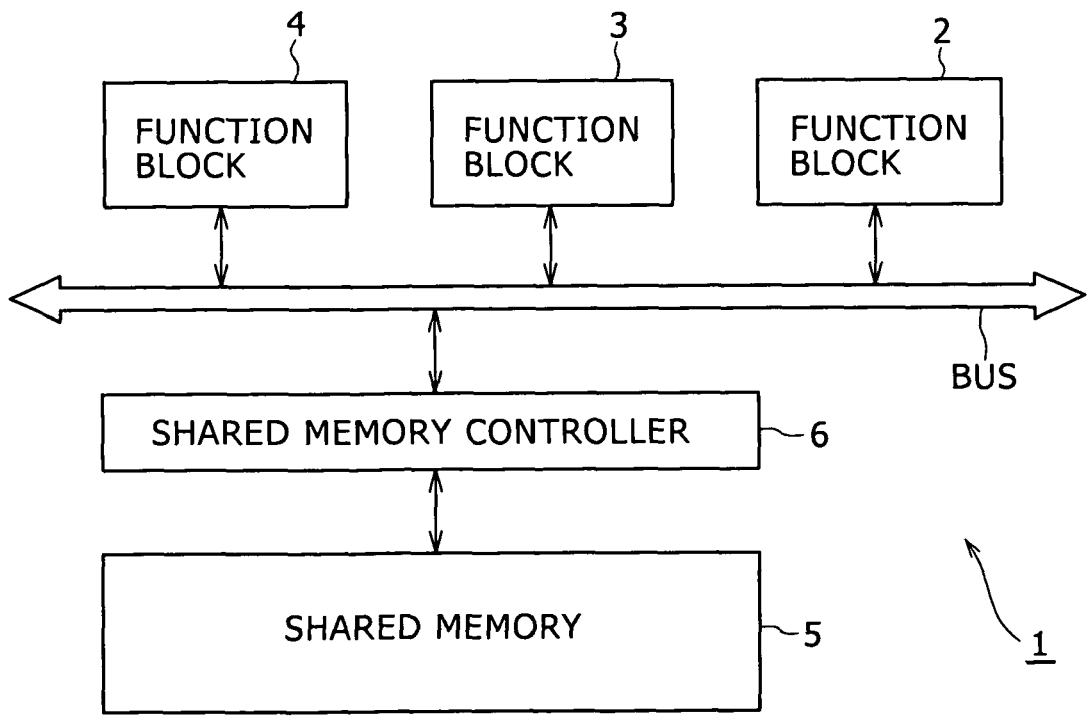
FIG. 7 is a block diagram showing a typical structure in which a single shared memory is shared by a plurality of function blocks.

Even where the bus is used for the connection between the shared memory controller and the function blocks, the requesting function block may be identified using an appropriately assigned bus signal. The bus signal assignments allow each of the function blocks to be furnished with the cache area, compressed cache area, and non-cache are in the memory space of the shared memory. In this case, too, caching processes may be switched regarding each function block as discussed above in connection with the second embodiment. As another alternative, the structure of FIG. 1 and that of FIG. 5 may be combined to have only part of the function blocks connected directly to the shared memory controller, as shown in FIG. 6. In this setup, only part of the function blocks can be connected directly to the shared memory controller in a structure where cache control exercised by a particular function block is mixed with cache control based on the address map.

Although the above-described embodiments were shown having the shared memory constituted by a random access memory, this is not limitative of the present invention. Alternatively, the shared memory may be provided in the form of an optical disk drive, a hard disk drive, or some other suitable storage device.

With the above-described embodiments, the cache memory was shown controlled by suitably structured hardware. Alternatively, the cache memory may be controlled through processing by software. In this case, the program or programs making up the software may be offered recorded on such recording media as optical disks, magnetic disks, or memory cards.

With the above-described embodiments, the present invention was shown applied specifically to the video camera. Alternatively, the invention may be applied extensively to diverse kinds of video equipment such as electronic still cameras and optical disk devices, as well as to various types of data processing apparatuses. In industrial terms, the present invention may be applied most advantageously to imaging machines and video equipment such as video cameras.

It should be understood by those skilled in the art that various modifications, combinations, sub combinations and alterations may occur depending on design requirements and other factor in so far as they are within the scope of the appended claims or the equivalents thereof.

What is claimed is:

1. A data processing apparatus for processing data by causing a plurality of function blocks to share a single shared memory, said data processing apparatus comprising:
    a memory controller configured to cause said plurality of function blocks to write and read data to/and from said shared memory in response to requests from any one of said function blocks;
    a cache memory; and
    a companding section configured to compress the data to be written to said cache memory while expanding the data read therefrom; wherein
    said memory controller checks to determine which of a plurality of areas in said shared memory a write and/or read request from any one of said function blocks corresponds to,
    if said write and/or read request from one of said function blocks is found corresponding to a cache area of said shared memory, then said memory controller causes the data to be written and/or read to and/or from said shared memory and said cache memory in such a manner that the data is subjected to a caching process involving the use of said cache memory,
    if said write and/or read request from one of said function blocks is found corresponding to a compressed cache area of said shared memory, then said memory controller causes the data to be written and/or read to and/or from said shared memory and said shared cache memory in such a manner that the data is compressed by said companding section before being subjected to a caching process involving the use of said cache memory, and
    if said write and/or read request from one of said function blocks is found corresponding to a non-cache area of said shared memory, then said memory controller stops the use of said cache memory while causing the data to be written and/or read to/and from said shared memory,
    if said write and/or read request from one of said function blocks is found corresponding to said cache area of said shared memory, then said memory controller under control of a host controller causes the data to be written and/or read to and/or from said shared memory and said cache memory in such a manner that said caching process is stopped or that the data is compressed by said companding section before being subjected to said caching process involving the use of said cache memory; and/or
    if said write and/or read request from one of said function blocks is found corresponding to said compressed cache area of said shared memory, then said memory controller under control of said host controller causes the data to be written and/or read to and/or from said shared memory and said shared cache memory in such a manner that the data is not compressed by said companding section before being subjected to said caching process or that the use of said cache memory is stopped.

2. The data processing apparatus according to claim 1, wherein said memory controller checks an address of said write and/or read request from one of said function blocks against a memory map of said shared memory in order to determine which of the areas in said shared memory said write and/or read request corresponds to.

3. The data processing apparatus according to claim 1, wherein said memory controller determines which of said function blocks has issued said write and/or read request, before determining which of the areas in said shared memory said write and/or read request from the function block corresponds to.

4. The data processing apparatus according to claim 1, wherein said shared memory is furnished with said cache area, said compressed cache area, and said non-cache area regarding each of said function blocks.

5. The data processing apparatus according to claim 1, wherein said data is constituted by image data;
    said plurality of function blocks record said image data to said shared memory before successively processing the recorded data; and
    said non-cache area is an area to which to record said image data.

6. A shared memory accessing method for use with a data processing apparatus for processing data by causing a plurality of function blocks to share a single shared memory, said shared memory accessing method comprising the steps of:
    compressing the data to be written to a cache memory while expanding the data read therefrom;
    determining which of a plurality of areas in said shared memory a write and/or read request from any one of said function blocks corresponds to;
    if in said determining step said write and/or read request from one of said function blocks is found corresponding to a cache area of said shared memory, then causing the data to be written and/or read to and/or from said shared memory and said cache memory in such a manner that the data is subjected to a caching process involving the use of said cache memory;
    if in said determining step said write and/or read request from one of said function blocks is found corresponding to a compressed cache area of said shared memory, then causing the data to be written and/or read to and/or from said shared memory and said shared cache memory in such a manner that the data is compressed in a companding step before being subjected to a caching process involving the use of said cache memory; and if in said determining step said write and/or read request from one of said function blocks is found corresponding to a non-cache area of said shared memory, then stopping the use of said cache memory while causing the data to be written and/or read to/and from said shared memory, if said write and/or read request from one of said function blocks is found corresponding to said cache area of said shared memory, then a memory controller under control of a host controller causes the data to be written and/or read to and/or from said shared memory and said cache memory in such a manner that said caching process is stopped or that the data is compressed by a companding section before being subjected to said caching process involving the use of said cache memory; and/or if said write and/or read request from one of said function blocks is found corresponding to said compressed cache area of said shared memory, then said memory controller under control of said host controller causes the data to be written and/or read to and/or from said shared memory and said shared cache memory in such a manner that the data is not compressed by said companding section before being subjected to said caching process or that the use of said cache memory is stopped.

* * * * *